Patented Nov. 27, 1923.

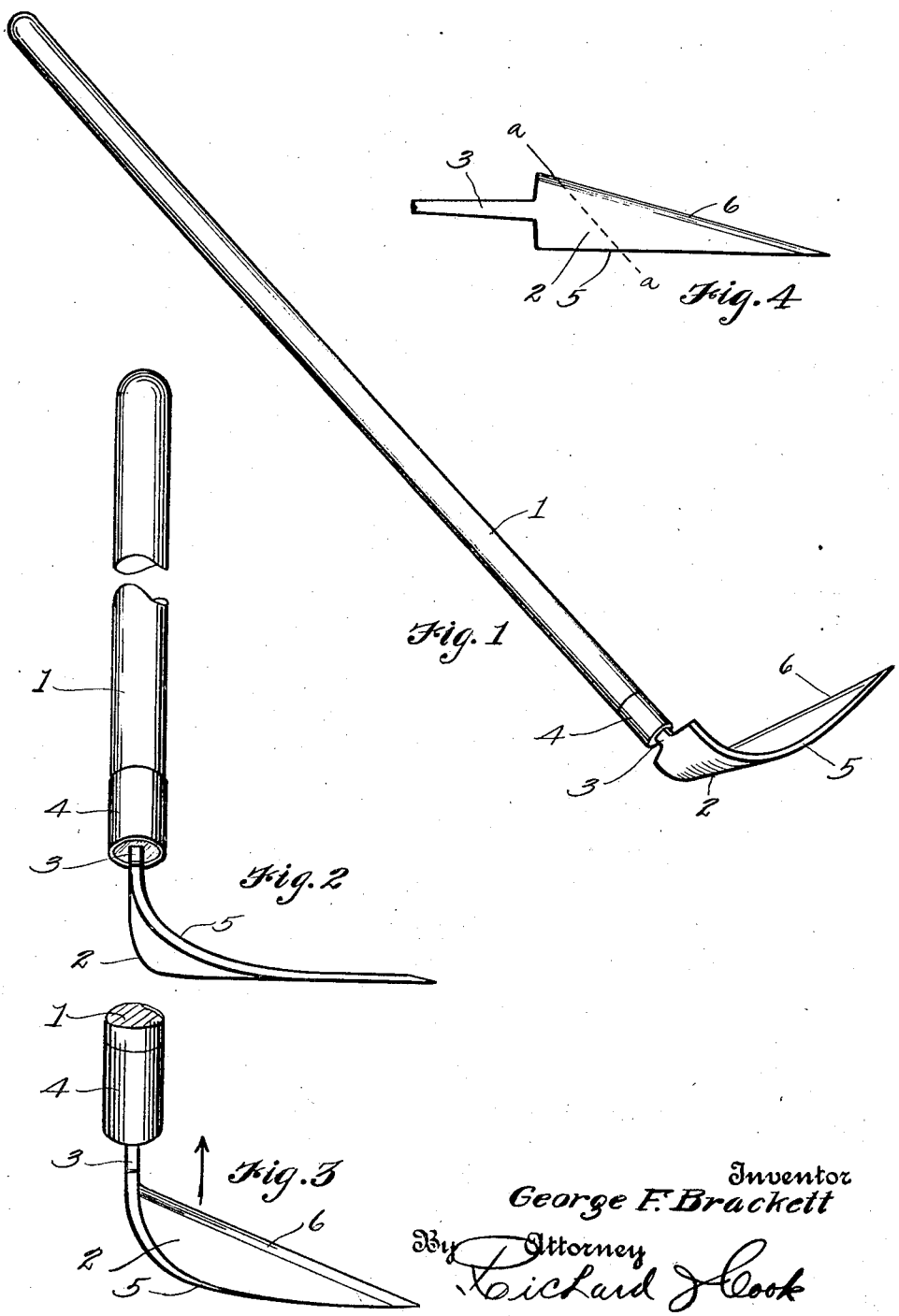

1,475,362

UNITED STATES PATENT OFFICE.

GEORGE F. BRACKETT, OF SEQUIM, WASHINGTON.

HOE.

Application filed May 10, 1922. Serial No. 559,791.

*To all whom it may concern:*

Be it known that I, GEORGE F. BRACKETT, a citizen of the United States, and a resident of Sequim, county of Clallam, and State of Washington, have invented certain new and useful Improvements in Hoes, of which the following is a specification.

My invention relates to improvements in garden hoes, and more particularly to a hoe especially suited for cutting weeds from between and about closely growing plants, and for other work where the ordinary type of flat hoe is not desirable and cannot be used to good advantage.

The object of my invention is to provide hoes of the above character, in both rights and lefts, and which have a relatively long and pointed cutting blade especially suited for the cutting of weeds from between closely placed plants, or for chopping and loosening the ground, and which is of such shape or curvature that when used for ordinary weed cutting purposes the ground and weeds will be turned over so that one may easily see the cleared spaced and there will be no possibility of weeds being missed.

It is also an object of the invention to provide a hoe of this type that can be made at a relatively small cost, and which will be serviceable in all gardening work.

In accomplishing these and other objects of the invention, I have provided the improved details of construction, the preferred forms of which are illustrated in the accompanying drawings, wherein—

Figure 1 is a perspective view of a hoe constructed in accordance with the present invention.

Figure 2 is a top view of the same, when the handle is extended upwardly at about a forty-five degree angle.

Figure 3 is a front view of the hoe as shown in Figure 2.

Figure 4 is a plan view of the hoe blade before being bent into its final shape.

Referring more in detail to the drawings—

1 designates the handle of the hoe, which may be of any desirable length, preferably about five feet, and 2 designates, as a whole, the blade portion which embodies the principal parts of the present invention.

The blade, at its base ends, is preferably about two and one-half inches in width and is provided centrally at that end with a shank 3 which extends into the end of the handle 1 and may be held tightly therein by means of a ferrule 4 about the end of the handle.

Before the blade is bent, it is of triangular form, as shown in Figure 4, the shank end as before stated being about two and one-half inches long, the back edge 5 being about ten inches long and the other edge being sharpened throughout its length to form a cutting edge 6.

In forming the blade for use by a right handed person it is bent upwardly approximately on the dotted line $a$—$a$ shown in Figure 4, so that the greater part of the cutting edge 6 and body of the blade will lie in a horizontal plane while the base end portion will lie in a vertical plane with the shank 3 extended upwardly at about a forty-five degree angle. There is to be a relatively sharp turn at the bend in the cutting edge, while the back edge 5 makes a long and gradual curve. With the blade shaped in this manner, if it is drawn in the direction of the arrow in Figure 3, it will act after the fashion of a plow share and the earth and weeds cut thereby will be turned over so that there will be a clear space left at that side of the blade and one will not be apt to miss spaces that otherwise would appear to have been gone over.

It is readily apparent that such a hoe would be very useful, due to the sharpened point provided at the end of the blade, for chopping or loosening up hard ground, and for cutting weeds from between closely growing plants.

It will also be apparent that the device can be made in rights and lefts and in various sizes, as desired.

Having thus described my invention, what I claim as new therein and desire to secure by Letters-Patent, is:

A hoe blade of the class described, comprising an elongated, triangular body having a mounting shank extended from its base end; and sharpened throughout the length of its longer, inner edge, said body being bent so that the cutting edge and greater part of the blade body will lie in a horizontal plane while the shank and base end will lie in a vertical plane, with the bend in the cutting edge being relatively sharp and the back, or other edge of the blade curved gradually from the shank and toward the blade point for the purpose set forth.

Signed at Seattle, Washington, this 5th day of May, 1922.

GEORGE F. BRACKETT.